P. P. STACK.
AUTOMATIC HOSE REGULATING LAWN SPRINKLER AND ADJUSTABLE SUPPORT.
APPLICATION FILED APR. 28, 1911.
1,037,557.
Patented Sept. 3, 1912.
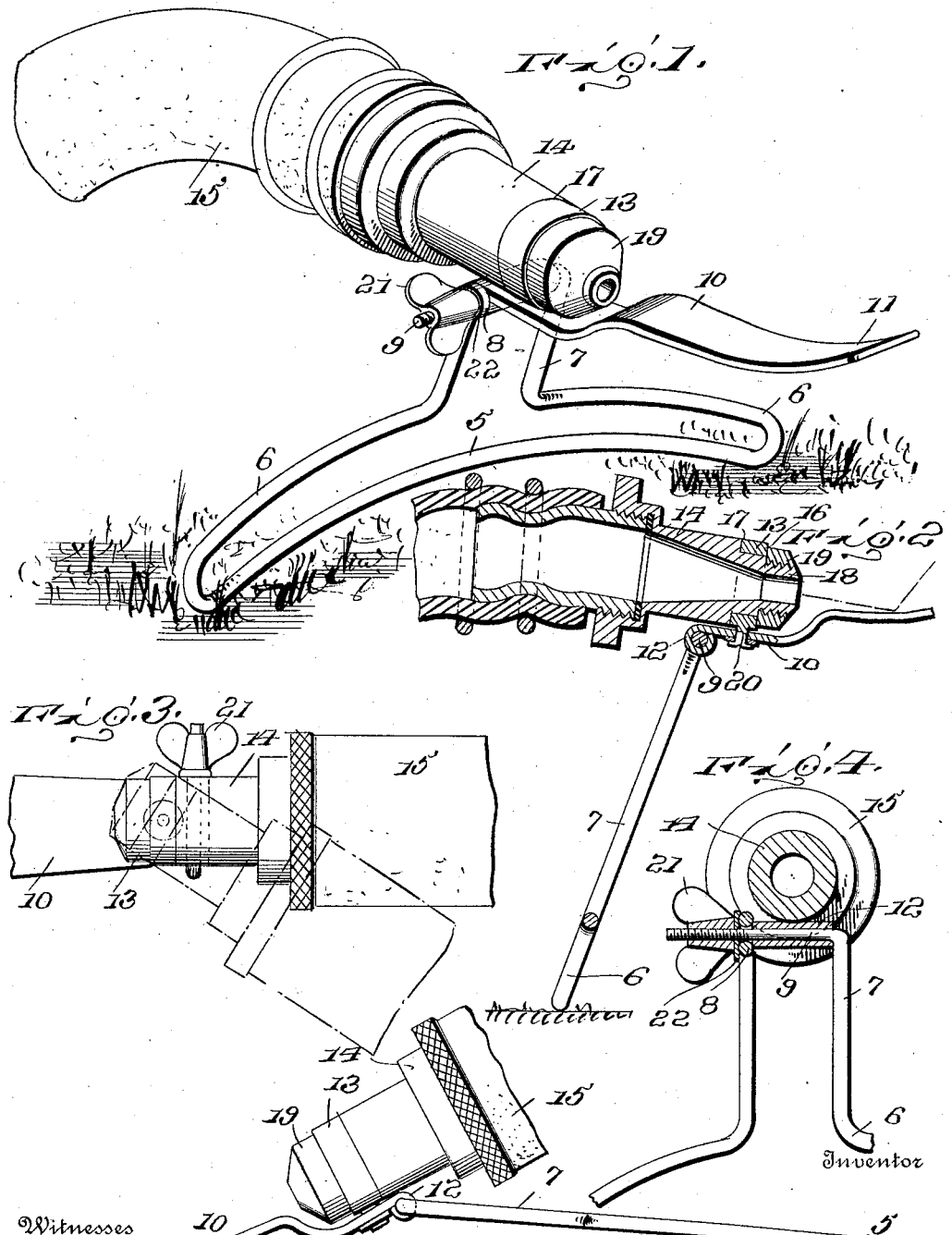

UNITED STATES PATENT OFFICE.

PATRICK P. STACK, OF SALT LAKE CITY, UTAH.

AUTOMATIC HOSE-REGULATING LAWN-SPRINKLER AND ADJUSTABLE SUPPORT.

1,037,557.   Specification of Letters Patent.   Patented Sept. 3, 1912.

Application filed April 28, 1911. Serial No. 623,982.

*To all whom it may concern:*

Be it known that I, PATRICK P. STACK, a citizen of the United States, residing at Salt Lake City, in the county of Salt Lake and State of Utah, have invented certain new and useful Improvements in Automatic Hose-Regulating Lawn-Sprinklers and Adjustable Supports, of which the following is a specification.

This invention relates to automatic sprinklers and has for its object the provision of a comparatively simple and thoroughly efficient device of this character, capable of being readily attached to a garden hose or the like, and which will cause the water to be discharged therefrom either in a solid stream or in the form of a spray.

A further object is to provide a lawn sprinkler, the construction of which is such that the hose will automatically adjust itself to the variations in water pressure without overturning the sprinkler or otherwise displacing the same.

A further object is to provide a sprinkler including an adjustable support having a spraying plate or tongue pivotally mounted thereon and provided with a swiveled bearing ring adapted to receive the nozzle of a hose so as to permit said nozzle to rotate in the bearing ring and to be swung laterally on either side of the spraying plate.

A further object is to provide means whereby the spraying plate may be adjusted at any angle or inclination with respect to the hose so as to direct the stream or spray in different directions, and means for clamping the spraying plate in adjusted position.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of an automatic lawn sprinkler constructed in accordance with my invention; Fig. 2 is a longitudinal sectional view of the same; Fig. 3 is a top plan view, showing in dotted lines, the manner of tilting the nozzle to one side of the spraying plate when it is desired to discharge a solid stream from the hose; Fig. 4 is a transverse sectional view, showing the manner of clamping the spraying plate in adjusted position; Fig. 5 is a side elevation, showing the adjustable support in lowered position.

Corresponding and like parts are referred to in the following description and indicated in all the views of the drawings by the same reference characters.

The improved lawn sprinkler forming the subject matter of the present invention comprises an adjustable support 5, preferably formed of a single length of wire having an intermediate portion thereof bent upon itself to produce oppositely disposed downwardly inclined supporting feet 6, the wire being thence extended upwardly to form spaced parallel arms 7, one of which terminates in an eye 8, while the metal forming the end of the mating arm is bent at right angles thereto and extended through the eye 8 to form a transverse bar 9.

Pivotally mounted on the bar 9, is a spraying plate or tongue 10, preferably formed of a single sheet of flat metal, one end of which is deflected upwardly at 11, while the other end thereof is bent or coiled in the opposite direction to form a transverse loop 12 for the reception of the bar 9, said loop being interposed between the arms 7 so as to center the spraying plate with respect to the support, as best shown in Fig. 1 of the drawings.

Pivotally mounted on the upper surface of the spraying plate 10, is a bearing ring 13, in which is journaled the nozzle 14 of a hose, indicated at 15. The nozzle 14 is provided with a reduced cylindrical portion 16 defining a circumferential shoulder 17 for engagement with the bearing ring 13, the free end of the nozzle having a reduced bore to increase the velocity of the water and having its exterior wall threaded at 18 for engagement with a clamping nut 19, which latter bears against the ring 13 and serves to hold the nozzle in position on the spraying plate.

The bearing ring 13 is provided with a pin 20 which extends through an opening in the spraying plate or tongue 10 so as to form in effect a swivel connection between the bearing ring and plate, thus to permit said bearing ring, together with the nozzle, to be swung laterally and thus direct the stream of water on either side of the spraying plate, as desired.

The wire forming the free end of the arm 9 is extended longitudinally through the eye 8 and provided with threads for engagement with a correspondingly threaded wing nut 21, there being a washer 22 interposed between the eye 8 and adjacent face of the wing nut 21 so that after the spraying plate has been adjusted at the desired angle or inclination with respect to the support 5, said plate may be readily secured in adjusted position by rotating the wing nut.

The deflected end 11 of the plate 10 is disposed in the path of the water from the spraying nozzle so that the impact of the water on the flat face 11 of the plate will spread or spray the water and uniformly distribute the latter over a relatively large area.

In using the device, the nozzle 14 is connected with the male coupling on the end of the hose 15, after which the wing nut 21 is released and the spraying plate 10 adjusted at the desired angle or inclination with respect to the support, the wing nut 21 being subsequently tightened so as to hold said plate in adjusted position, as before stated.

It will here be noted that the wing nut 21 not only serves to hold the arms 7 of the support in proper position, but also serves to clamp the spraying plate or tongue between said arms. It will also be noted that by reason of the fact that the bearing ring 13 is swiveled on the spraying plate 10 and the nozzle 14 loosely mounted in said ring, said nozzle, together with the hose, is free to rotate or swing laterally on either side of the plate, thus to automatically adjust the hose to the variations in water pressure without tipping over the support 5 or otherwise accidentally displacing the same.

If a solid stream is desired, it is merely necessary to swing the nozzle to either side of the spraying plate, and if a spray is desired, as for instance, when sprinkling lawns, the volume of water from the nozzle is directed on the deflected end of the plate 10, which latter may be adjusted vertically with respect to the bar 9 so as to throw the water at any desired elevation, as before stated.

The device is extremely simple in construction and may be manufactured and placed on the market at a comparatively small cost.

Having thus described the invention, what is claimed as new is:

1. A device of the class described including a support, a spraying plate pivotally mounted for vertical tilting movement on the support, a bearing ring pivotally mounted on the plate, a nozzle journaled in the bearing ring, and means for securing the spraying plate in different positions of adjustment.

2. A device of the class described including a support, a spraying plate having one end thereof pivotally mounted on the support and its other end deflected upwardly and adjustable vertically of the support, a bearing ring pivotally mounted on the spraying plate, a nozzle journaled in the bearing ring, and a clamping device carried by the support for holding the spraying plate in different positions of adjustment.

3. A device of the class described including a support, a spraying plate pivotally mounted for vertical tilting movement on the support, a nozzle having a reduced cylindrical portion defining a shoulder and provided with a threaded terminal, a bearing ring pivotally mounted on the spraying plate and embracing the cylindrical portion of the nozzle at said shoulder, and a clamping nut engaging the threaded end of the nozzle for preventing accidental displacement thereof.

4. A device of the class described comprising a support having spaced arms, one of which is provided with an eye and the other with a transverse bar extending through said eye and having its terminal threaded, a spraying plate pivotally mounted on the transverse bar of the support, a bearing ring swiveled on the spraying plate, a nozzle journaled in the bearing ring, and a clamping nut engaging the threaded end of the transverse bar for clamping the spraying plate in adjusted position.

5. A device of the class described including a support having spaced arms, one of which is provided with an eye, the free end of the other arm being extended through said eye to form a transverse bar having terminal threads, a spraying plate having one end thereof provided with a loop embracing the transverse bar between said arms and its other end deflected upwardly, a bearing ring swiveled on the spraying plate, a nozzle journaled in the bearing ring, and a clamping device engaging the threads on the bar and bearing against the eye for holding the spraying plate in different positions of adjustment with respect to the support.

6. A device of the class described including a support formed of a single length of wire having its intermediate portion bent to produce laterally extending arms, the wire being thence extended upwardly to form spaced arms, one of which is provided with a terminal eye and the other with a transverse bar passing through said eye and provided with terminal threads, a spraying plate interposed between said arms and pivotally mounted on the bar, a bearing ring swiveled on the spraying plate, and a clamping nut engaging the threads on the bar for clamping the eye in engagement with said spraying plate.

7. A device of the class described including a support, a spraying plate pivotally mounted for tilting movement in a vertical plane on the support, a freely rotatable nozzle pivotally mounted on the spraying plate, said spraying plate and support being adjustable relatively to each other, and means for clamping the parts in adjusted position.

8. A device of the class described including a support, a spraying plate pivotally mounted for vertical tilting movement on the support, a bearing ring swiveled on the spraying plate in advance of the pivotal axis thereof, a spraying nozzle loosely mounted for rotation in the bearing ring and means for securing the spraying plate in different positions of adjustment, the free end of the spraying plate being bent upwardly and extended in the path of the stream from the nozzle.

9. A device of the class described including a support, a spraying plate pivotally mounted for vertical tilting movement on the support, a bearing ring pivotally mounted on the plate and adapted to receive a nozzle, and means for securing the spraying plate in different positions of adjustment.

10. A device of the class described including a support, a spraying plate pivotally mounted for tilting movement on the support, a bearing ring pivotally mounted on the spraying plate in advance of the pivotal axis thereof and adapted to receive a nozzle, and means for securing the spraying plate in different positions of adjustment.

In testimony whereof, I affix my signature in presence of two witnesses.

PATRICK P. STACK. [L. S.]

Witnesses:
JOHN A. STEWARD,
CHAS. PAULLIN.

---

Copies of this patent may be obtained for five cents each by addressing the "Commissioner of Patents, Washington, D. C."